United States Patent
Halpin et al.

(10) Patent No.: US 6,830,605 B2
(45) Date of Patent: Dec. 14, 2004

(54) RECOVERY OF METAL VALUES FROM CERMET

(75) Inventors: Peter T. Halpin, Great Falls, VA (US); Ulrich R. Schlegel, Warrenton, VA (US); Kenneth E. Riegel, Orwigsburg, PA (US)

(73) Assignee: World Resources Company, McLean, VA (US)

( * ) Notice: Subject to any disclaimer, the term of this patent is extended or adjusted under 35 U.S.C. 154(b) by 0 days.

(21) Appl. No.: 10/387,505

(22) Filed: Mar. 14, 2003

(65) Prior Publication Data

US 2004/0177721 A1 Sep. 16, 2004

(51) Int. Cl.[7] .............................................. C22B 1/248
(52) U.S. Cl. ........................... 75/300; 75/414; 204/291
(58) Field of Search ..................... 75/300, 414; 204/291

(56) References Cited

U.S. PATENT DOCUMENTS

| | | |
|---|---|---|
| 400,664 A | 4/1889 | Hall |
| 3,393,876 A | 7/1968 | Elmore .......................... 241/20 |
| 3,689,253 A | 9/1972 | Dorenfeld et al. ............. 75/77 |
| 4,029,494 A | 6/1977 | Kapanen et al. ............ 75/10 R |
| 4,118,219 A | 10/1978 | Elmore et al. ................ 75/103 |
| 4,119,454 A | 10/1978 | Rath .............................. 75/12 |
| 4,274,785 A | 6/1981 | Ogawa et al. .............. 414/173 |
| 4,356,030 A | 10/1982 | Halpin et al. .................. 75/21 |
| 5,186,740 A | 2/1993 | Sancinelli ..................... 74/401 |
| 5,865,980 A | 2/1999 | Ray et al. .................... 205/367 |
| 6,030,518 A | 2/2000 | Dawless et al. ............. 205/387 |
| 6,423,204 B1 * | 7/2002 | Ray et al. ..................... 205/387 |

FOREIGN PATENT DOCUMENTS

RO          66833     *  6/1980

OTHER PUBLICATIONS

"Non–Ferrous Metal Works of the World", 1995, Metal Bulletin Books Ltd., 7th Ed., England.
"Extractive Metallurgy of Copper", vol. 1, Chapter 23, The International Nickel Company of Canada Limited, Chapter 11, pp. 218–233.
"Extractive Metallurgy of Copper", A.K. Biswas and W.G. Davenport, 3rd Ed., 1994, pp. 74–99, 194–223.
"Copper Technology & Competitiveness", Congress of the U.S., Office of Technology Assessment, pp. 126–139.
"Pollution Prevention and Abatement Handbook", World Bank Group, Jul. 1998, pp. 349–352.
"Copper Smelting", Pollution Prevention and Abatement Handbook, World Bank Group, Jul. 1998, pp. 291–294.

* cited by examiner

*Primary Examiner*—Melvyn Andrews
(74) *Attorney, Agent, or Firm*—Bacon & Thomas, PLLC (57) ABSTRACT

Cermet material obtained from unused inert anodes, used inert anodes and cermet used in the production of inert anodes is beneficiated into a nonferrous metal concentrate composition from which metal values contained in the composition may be readily recovered by using a conventional smelting process. The invention also relates to the use of the composition in a smelting process for the recovery of metal values from the cermet composition of the

12 Claims, 3 Drawing Sheets

RECOVERY OF METAL VALUES FROM CERMET

BACKGROUND OF THE INVENTION

1. Field of the Invention

The present invention relates to the recovery of metal values from cermet material, especially cermet material of which inert cermet positive and negative electrodes (anodes) are comprised. Such inert cermet anodes include inert or non-consumable electrodes used in the production of aluminum by electrolytic reduction of alumina dissolved in a molten salt bath. In particular this invention pertains to a composition comprising fired and/or unfired cermet in a form suitable for the recovery of metal values therefrom in a smelter, especially a nickel or copper smelter, and to a smelting process which uses this composition as feedstock by itself or with ore and/or ore concentrate.

2. Background Information

Aluminum has been produced using the well known Hall-Heroult cell since Charles Martin Hall's invention for a process of reducing aluminum from its fluoride salts by electrolysis which is the subject of U.S. Pat. No. 400,664 issued on Apr. 2, 1889. In this electrolytic reduction process aluminum oxide (e.g., alumina or $Al_2O_3$) is dissolved in a bath of molten salt. The aluminum content of the alumina is reduced to metallic or elemental aluminum by an electrolytic process in which the aluminum of the aluminum oxide is reduced at the anode whereby metallic or elemental aluminum is produced. For many years carbon anodes were used in this process. The carbon anodes are consumed in the process as the carbon reacts with the alumina to produce elemental aluminum and carbon dioxide during electrolysis.

Recently inert anodes have been introduced for use in electrolytic production of aluminum. These inert anodes have the advantage of not being consumed during the reduction of the aluminum. Consequently these inert anodes are also referred to as non-consumable anodes or as dimensionally-stable anodes.

The inert or non-consumable anodes must be able to withstand the harsh conditions in which they are used (i.e., a molten salt bath which contains dissolved alumina). Furthermore, since these anodes are not consumed during the process for making aluminum, they must withstand these extremely harsh conditions for a considerable length of time. In particular the inert anode material must satisfy a number of difficult conditions. For example, the material must not react with or dissolve to any significant extent in the cryolite electrolyte which is typically used in the Hall-Heroult process. The anode material must not react with oxygen or corrode in an oxygen-conitaining atmosphere. This material should be thermally stable at temperatures of about 1000° C. and should have good mechanical strength. The anode material must have electrical conductivity greater than 120 $ohm^{-1}cm^{-1}$ at the smelting cell operating temperature about 950°–970° C. In addition, aluminum produced with the inert anodes should not be contaminated with constituents of the anode material to any appreciable extent.

Inert anodes made from cermet material have been found to satisfy the above-mentioned conditions, thus making them particularly suitable in the Hall-Heroult process.

Cermets are composite materials which have a ceramic phase and a metallic phase. They have the unique property which combines the desirable features of ceramics and metals including chemical inertness and electrical conductivity. Examples of inert anodes made from a cermet are described in U.S. Pat. Nos. 5,865,980 and 6,030,518, the specifications of which are incorporated herein by reference.

Because of the extraordinarily harsh operating environment of the cell, eventually these inert anodes made from cermet need to be replaced. Replacing the used anodes with new ones has created a disposal problem with a loss of the valuable metal components thereof. Since a typical inert anode contains combinations of metals that may include nickel, silver, copper and iron, disposal of these anodes represents a significant loss to the aluminum industry if these metals are not recovered and either sold or recycled. An inert anode described in U.S. Pat. No. 5,865,980 contains 14 wt. % copper, 7% silver, 40 wt. % nickel oxide, 38 wt. % iron and traces of other metals. Thus disposing of these anodes without recovering the metal values therefrom will be wasteful and economically disadvantageous.

Oxides of tin are also found in some inert anode materials (JOM Light Metals 1996, "Inert Anodes for the Primary Aluminum Industry" by Rudolf Pawiek, and JOM Light Metals, May 2001, "Cell Operations and Metal Purity Challenges for the use of Inert Anodes" by Thoustad and Olsen").

The composition and characteristics of inert anodes which are used in the aluminum producing industry are discussed in an article in JOM Light Metal Age, February 2001 by Joseph Benedyk. It is noted in this article that the cermet consists of a ceramic phase and a metallic phase wherein the ceramic phase may be a matrix of nickel ferrite having a dispersion therein of a metallic phase which, for example, may be a nonferrous alloy such as copper or silver.

In addition to the used cermet anodes, there are also waste cermet anodes due to breakage, cermet ingredient materials and residues produced during the manufacturing process of the inert anodes and inert anodes that have failed to meet quality control standards. The same problems noted above with respect to the used anodes, also applies to the waste cermet associated with the above-identified materials. Thus the above-noted problems apply to used and unused inert anode and the manufacturing residues.

Although it is highly desirable to recover the valuable metals from the above-noted anode materials, no one has ever suggested any economically feasible method for their recovery, despite the need in the industry for solving this problem. This is believed to result from the fact that the inert characteristic and other characteristics which make these anodes resist the harsh conditions within an electrolytic aluminum reduction cell, make the recovery of metal values from these anodes extremely difficult and challenging. Prior to this invention no economically viable methods were known for recovering the metal values from these inert anodes. It has now been discovered by the inventors that the metal values from these inert anodes and anode materials may be economically recovered by smelting, especially in a conventional nickel or copper smelter, by converting the cermet of the inert anodes into a composition which can be smelted in the smelter.

Rath in U.S. Pat. No. 4,119,454 discloses a method for recovering ferrous metal values from steel scrap. The process employs a smelting step in which the steel scrap is fed into a smelter which produces a slag layer on top and a molten layer underneath the slag layer. The process provides for the separate recovery of the slag and metal layers. Rath does not disclose or suggest the recovery of metal values from cermet material in general nor specifically from inert anodes which comprise cermet. Furthermore, Rath does not disclose or suggest a cermet composition in a form which can be readily smelted in a conventional smelter. In addition, Rath is not in any way concerned with solving the technical problems associated with recovering metal values from an extremely inert composition which is designed to resist the harsh conditions utilized in aluminum smelting.

Kapanen et al. in U.S. Pat. No. 4,029,494 disclose a process and apparatus for recovering noble metal values from anode slime produced in an electrolytic copper process. The anode slime containing the recoverable noble metals is subjected to a smelting procedure. Kapanen et al. do not disclose or suggest using their procedure to recover metal values from anodes which comprise cermet. In addition, Kapanen et al. are not in any way with solving the technical problems noted above with respect to recovery of metal values from inert cermet material which is designed to withstand the harsh conditions in aluminum smelting.

Sancinelli in U.S. Pat. No. 5,186,740 discloses the pretreatment of scrap prior to a smelting procedure in which metal values are recovered from the scrap. The pretreatment includes reducing the size of the scrap before it is introduced into a smelter and separating components such as organic materials from the scrap prior to the smelting procedure. Sancinelli does not disclose or suggest any process for recovering metal values from inert anodes which comprise cermet. Furthermore, since Sancinelli is not concerned with the recovery of metal values from cermet, he does not address any of the unique problems associated with recovery of metal values from inert cermet which is specifically designed to withstand the harsh conditions in aluminum smelting.

Elmore et al. in U.S. Pat. No. 4,118,219 disclose a process in which components of lead-acid batteries are subjected to a smelting procedure for the recovery of metal values therefrom. In this procedure a solid metal fraction is isolated and sent to a refinery where it is dried, melted and/or smelted and refined to produce lead alloys which can be re-used in new batteries. Elmore et al. disclose the use of flux in the smelting procedure and further disclose the use of a carbon additive as a reductant in the smelting procedure. However, Elmore et al. do not disclose or suggest the recovery of metal value from inert anodes which comprise cermet and they are not in any way concerned with overcoming the above-noted technical problems associated with recovery of metal values from such an inert material like cermet.

Ogawa et al. in U.S. Pat. No. 4,274,785 disclose the introduction of anode scrap into a converter furnace. The anode scrap functions as a cooling material when it is introduced into the furnace. Ogawa et al. do not disclose or suggest the recovery of metal values from inert anodes which comprise cermet and they do not address any of the above-noted technical problems associated with recovery of metal values from such an inert material.

U.S. Pat. Nos. 3,393,876 and 3,689,253 are of additional interest since they disclose a smelting procedure for the recovery of lead from batteries.

None of the above-noted references address the unique problems associated with the recovery of metal values from cermet material which is designed to withstand the harsh conditions within an aluminum smelter and none of these references disclose or suggest the formation of a cermet material in a form from which metal values can be recovered under metal recovery conditions in a smelter.

It is possible to separate elemental metal from other components, but such separation techniques are not suitable for the recovery of the metal values from cermet and furthermore these techniques do not recover metal values from metal compounds found in the cermet.

SUMMARY OF THE INVENTION

It is an objective of the present invention to provide a composition which comprises cermet material, especially used and unused, in a form which is suitable for smelting so that metal values from the cermet may be recovered in a smelting procedure.

It is also an objective of the present invention to recover metal values from a composition which comprises cermet material, using a smelter, especially a nickel or copper smelter.

These and other objectives are achieved by first obtaining the cermet material from which the metal values are to be recovered. Suitable sources of the cermet include but are not limited to used and unused inert anodes which contain cermet and cermet used in and/or from the manufacturing of the inert anodes. Cermet used in the manufacturing of the inert anodes includes inert anode manufacturing residue, and inert unused anode from the manufacturing facility. Other cermet containing materials or articles may be used as the source for cermet.

Any of the above-mentioned sources of cermet, including any combination of these sources (henceforth referred to herein as inert anode material), is first qualified and characterized using physical/analytical characterization to determine the recyclability of the inert anode material.

Physical characterization is carried out to determine material friability and to determine whether the material is sufficiently free of debris and safe to handle for recycling. Analytical characterization is carried out to determine the mineral and metal constituents and their content and to determine if the inert anode material is suitable to produce a concentrate material feedstock for a smelter based on specific smelter concentrate feedstock specifications. Analytical characterization is also conducted to determine the recoverable metal value, mineral content, impurity levels and levels of constituents which may be deleterious to the smelting process which will be used to recover the desired metal values.

Next the inert anode material is beneficiated to produce the concentrate of this invention using beneficiation techniques which are well known to those skilled in the art of ore mining and metallurgy technology. Such beneficiation processes include any conventional sorting and size reduction to achieve the desired material handling flow and particle size characteristics conducive to the smelting procedure. These characteristics are specifically related to the smelting process parameters and the selected type of metal concentrate product technically acceptable for the smelting process. If the source of cermet includes non-cermet components, these components are desirably separated from the cermet as part of the beneficiation process. For example, in the case where inert anodes having nickel or nickel-chrome rods (JOM Light Metal Age 2001, "Inert Anodes for the Hall-Heroult Cell: The Ultimate Material Challenge" by Joseph C. Benedyk, May 2001) are used as a source for cermet, non-cermet components such as the rods or other metal components are desirably removed as part of the process of beneficiation.

In some instances the source of the cermet will not contain any non-cermet component. In those instances the cermet is beneficiated solely by comminution to produce the concentrate of this invention. Since there are no non-cermet components to be removed, this beneficiated cermet is the same as the beneficiated inert anode material from which non-cermet components have been removed as part of the beneficiation process.

Additives (e.g., metallurgical fluxing reagents, other beneficial ingredient additives including other metal bearing materials, ores or ore concentrates) which are needed or useful to achieve desired metallurgical quality specifications for the resulting concentrate produced from the beneficiated inert anode material prior to the introduction into the smelter, are desirably added prior to the subsequent smelting process. These ingredient additives are advantageously mixed with the beneficiated inert anode material (i.e., the concentrate) to formulate a concentrate composition containing additives that can be fed into the smelter for the recovery of the metal values therefrom. Binders and/or dust suppressants are desirably added to the beneficiated inert anode based concentrate so that it may be agglomerated and/or pelletized to thereby form a suitable concentrate of this invention from which the metal values can be recovered in the smelting procedure.

The term "concentrate" as used herein refers to material which has a sufficiently high level of metal (i.e., concentration) to be recovered in a smelting process which uses a primary smelter regardless of whether any concentration steps have been taken to make the concentrate. Typically ores require extensive removal of earthy and valueless constituents during beneficiation of the ore to obtain the desired concentration of the metal to be recovered. The beneficiation of inert anode material does not require extensive concentration steps.

The concentrate which includes the additives and the beneficiated inert anode material or other beneficiated cermet constitutes one aspect of this invention. This concentrate with the additives such as fluxing reagent contained therein, may be sent to a conventional smelter, with the additives such as fluxing reagent contained therein, for the recovery of the metal values contained therein.

Alternatively, the fluxing additives may be added at the smelter along in a process called bedding. In the bedding process the beneficiated inert anode material (i.e., the concentrate of this invention), is formulated with desired proportions of required fluxes such that when the bedded material is removed to the smelter, the concentrate is removed with the appropriate quantity of flux.

The concentrate material, which preferably includes the additives and is preferably in an agglomerated form, may be roasted under oxidizing conditions prior to the introduction of the concentrate into the smelter to begin the impurity removal process and to oxidize certain constituent compounds.

The above-noted concentrate represents one aspect of this invention which pertains to a composition which consists essentially of isolated cermet material in a form which is suitable for conventional nickel and/or copper smelting so that metal values from the cermet may be recovered in a smelting procedure.

This invention also pertains to the use of the aforementioned concentrate in a smelter to recover the metal values from the inert anode material. Thus in another aspect this invention pertains to a smelting procedure wherein the feed to the smelter comprises the aforementioned concentrate which contains the inert anode material in a form suitable for smelting.

The smelter used in the process of this invention is a primary smelter, which is one that has been designed to extract nickel or copper along with other associated metal values from ore. The term "primary", principally denotes that the metals extracted are from ore (i.e., primary smelter) and not from a source which is typically metal scraps (secondary smelter). Primary smelters are preferred for use in the smelting process of this invention because they have the ability to efficiently and economically extract and recover the valuable metals from the concentrate of this invention. In addition, by using the metallurgical process of a primary smelter, the concentrate of this invention is advantageously combined with ore concentrates in the smelting process thereby obtaining the efficiencies and favorable economics associated with primary smelting. The primary smelting process has the following characteristics which distinguishes the process from secondary smelting.

Importantly, the principal function of the primary smelting process is to extract metals of value from concentrates. Chemical reduction during the molten phase of this process accomplishes this wherein fusion of the ore and concentrate impurities report to the slag which is comprised of fluxing reagents that help control both the viscosity of the total molten mass and density of the resulting fusible slag. The resulting lower density of the molten slag gravimetrically separates from the mass and floats to the surface where it is then removed for either disposal or reprocessing by its reintroduction to the smelter to recover any remaining values. Slags that are reprocessed are called reverts.

Secondary smelting, although flux reagent can be used, focuses on remelting the metals of value which originate from metallic scrap and not ore and concentrate. Re-melting facilitates forming and shaping of the metal for fabrication rather than extracting the metal from earthy components or other impurities.

The inert anode material used in the present invention contains the following metal or metals which can be recovered in abundance with this invention:

| | | |
|---|---|---|
| Nickel | Palladium | Cobalt |
| Copper | Rhodium | Osmium |
| Tin | Gold | Iridium |
| Silver | Platinum | Ruthenium |

Although different types of smelting processes and corresponding apparatus may be used in accordance with this invention, two of the more common smelting processes include the so-called continuous and flash techniques designed for sulfidic copper and/or nickel concentrates. Thus, copper and nickel smelters are the preferred for use in this invention. Copper and nickel smelting processes and their corresponding apparatus are especially useful in cases where the inert anode material contains precious metals such as silver and gold, or other platinum group metals.

The term "smelting" is well known to those skilled in the art and is a generic description for the chemical reduction of metal from its ore or concentrate by a process usually involving fusion, so that the earthy and other impurities, separating as lighter and more fusible slags, can readily be removed from the reduced metal. Generally smelting is understood by those skilled in the art as a process which is distinct from roasting, sintering, fire refining, and other pyrometallurgical operations. However in the newer technologies of flash or continuous smelting, some of these steps are combined.

The two most important steps of the primary smelting process for copper and/or nickel are reduction smelting which produces molten matte and molten slag, and matte smelting which produces molten blister and molten slag. Smelting to produce matte may be conducted in a reverberatory furnace, an electric furnace, a continuous furnace, or a blast furnace whereas, blister, the next stage, is usually performed in furnace called a converter, but there are exceptions in each case.

Typically the concentrate composition of this invention is used in the reduction smelting processes which produce molten matte and molten slag.

In the process of reduction smelting, the precious and platinum group metals together with the nonferrous metals such as cobalt, nickel and copper report to the matte, rather than to the slag, during the smelting process whereby they are accumulated and after converting remain in the blister. It is a relatively standard procedure to then recover the individual metal values by standard metallurgical processes such as electrowinning. Thus metal refining of the blister produces recovered precious metals, platinum group metals, and nonferrous metals such as nickel, cobalt and copper originally contained in the cermet.

In some instances it maybe desirable to recover nonferrous alloys directly from the blister without an intermediate metal refining procedure. This, however would normally be in cases where precious metals and/or platinum group metals are not present in the blister and the metal content of the blister is such, that as an alloy, it can be directly shaped and used for fabrication.

The slag produced by the smelting process may be recovered and used in the construction industry according to known methods. For example, the slag may be used as road aggregate, railroad ballast, blasting media, or as an ingredient in Portland cement. Alternatively, it may be disposed according to known disposal procedures for the safe disposal of slag.

It is also normal in smelting process to recycle the slag or a portion thereof as a reverts back to the smelter for the recovery of remaining metal values therefrom.

The present invention is advantageous because the beneficiated inert anode material may be returned to the inert anode manufacturing facility and incorporated into newly fabricated inert anodes. When using the beneficiated inert anode material in manufacturing new inert anodes, the beneficiated material must be qualified to ensure that it is within the specifications for the ingredients used in the inert anode manufacturing process. Alternatively the beneficiated inert anode material may be sent to the inert manufacturing facility for incorporation into newly fabricated inert anodes without prior qualification (physical and/or analytical), in which case the operator of the inert manufacturing facility will test the material to see if it meets manufacturing quality control standards. Economically the product life cycle may be enhanced by reuse in manufacturing, however, only a selected fraction of the beneficiated material may qualify for recycling to the manufacturing procedure, whereas with the smelting method of this invention, the total quantity of beneficiated material may be processed for the economic recovery of metal values therefrom. Moreover, the concentrate product of this invention, being in a form which can be smelted for the recovery of metal values therefrom, is a valuable commodity which can be sold to primary smelters for use as a smelting metal source feedstock by itself or in combination with ore-based smelting feedstock. This aspect of the invention is particularly advantageous because it creates a valuable marketable material commodity which would otherwise have to be disposed at considerable expense and loss of valuable metal content.

DETAILED DESCRIPTION OF THE INVENTION AND PREFERRED EMBODIMENTS

A detailed description of the invention will now be made with reference to FIG. 1.

Figure 1:
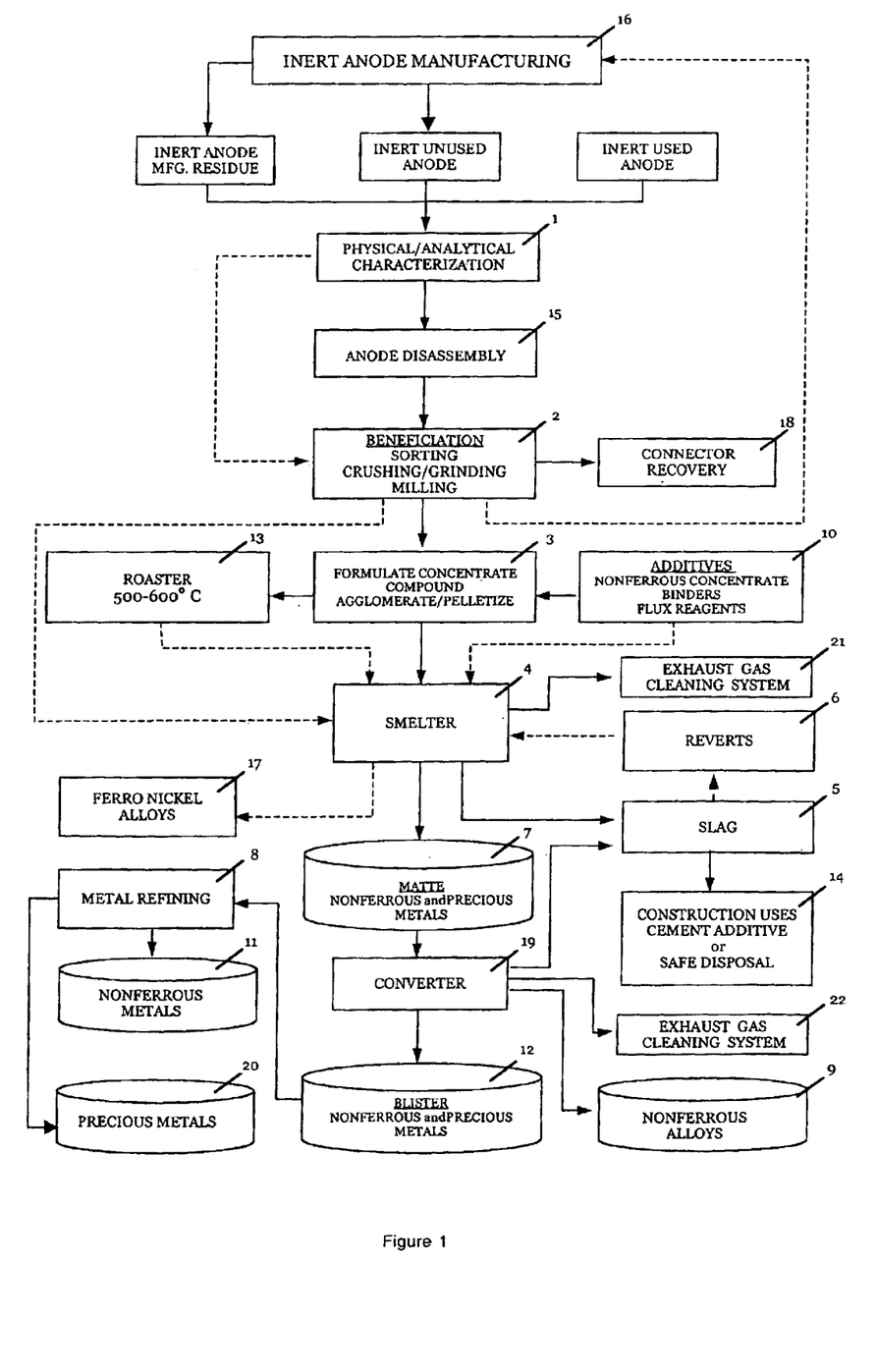
FIG. 1 is a flow sheet which represents a preferred embodiment of the processing and recovery of metal values from inert anode materials according to the present invention.

The inert anode material used in the present invention originates and is obtained from an inert anode manufacturing facility 16 as illustrated in FIG. 1. In addition, inert anode material of inert used anodes obtained from an aluminum production facility may be used as the inert anode material. The inert anode material obtained from the inert anode manufacturing facility includes inert anode manufacturing residue, and inert unused anode. The three identified sources of inert anode material may be used individually or any combination or subcombination thereof. In addition, although this invention is primarily directed toward the recovery of metal values from inert anode material, other cermet materials can be used in the practice of this invention. Thus it is understood that any cermet material may be substituted for the inert anode material when practicing this invention.

This invention is particularly useful for the recovery of metal values from the inert anodes described in U.S. Pat. Nos. 6,030,918 and 5,865,980. Thus, metal values may be recovered from used inert anodes, unused inert anodes and the corresponding unsintered unused inert anodes which are described in U.S. Pat. Nos. 6,030,918 and 5,865,980. Additionally, inert anode manufacturing residues in connection with manufacturing inert anodes according to the aforementioned two patents are also useful in this invention.

According to one aspect of this invention, the inert anode material may be recycled by being reused in the inert anode manufacturing facility after beneficiating the inert anode material. Before beneficiating the inert anode material, it is sent to a physical/analytical characterization procedure wherein the characterization is preferably conducted to determine the recyclability of the inert anode material. The procedure of physical characterization includes the examination and evaluation of a representative sample of inert anode material to ascertain texture, color, and size gradation, geometry and fracture patterns, content of malleable non cermet metallic components, and extraneous material and debris, and the determination of density, hardness and friability. Physical characterization is, as is known by those skilled in the art, the predicate for selecting appropriate devices for beneficiating by sorting, crushing, grinding and/or milling. Additionally, the acceptability for recycling of the inert anode material quality is based on an elemental analysis. Impurities deleterious and/or hazardous constituents could, based on the content, deem the material unacceptable. Analytical determinations are made with conventional metallurgical testing procedures standard in the industry.

Inert anode material which is determined to be acceptable may necessitate disassembly in anode disassembly unit 15. If disassembly is not required, it is beneficiated in beneficiation unit 2 and then is recycled by being reused as an ingredient in the inert anode manufacturing facility 16.

Recycling by reuse of the beneficiated inert anode material is optional. Instead of reusing the beneficiated inert anode material in the anode manufacturing facility, the beneficiated material, as a precious and/or nonferrous metal concentrate composition is suitable for smelting under conditions for the recovery of metal values therefrom in a smelting procedure. The term "nonferrous" is defined in the Dictionary of Mining Terms (Maclean Hunter Publishing Co.) as ores not worked primarily for their iron content. Thus the term "nonferrous metal concentrate" means that the concentrate contains sufficient precious, platinum group or nonferrous metal values which can be economically recovered in a smelter but also that it is of the quality beneficial to smelting. Nonferrous metal concentrate may contain iron in addition to the nonferrous metal. The term "precious metal" refers to gold and silver.

Inert anode materials from characterization unit 1 or from disassembly unit 15 (both used and unused) typically contain non cermet components such as metal supports, connectors, or rods which are sorted and removed as part of the process of beneficiating the inert anode material in beneficiation unit 2. Non cermet components such as the connectors that may be salvageable for reuse are removed to connector recovery unit 18. In the beneficiation step in beneficiation unit 2 devices such as supports and/or electrical connectors are removed so that the remaining cermet can be readily comminuted in beneficiating unit 2 without interference from these non-cermet materials which are not easily crushed or milled. Sorting and removal of these non-cermet components assures that the beneficiated cermet does not contain any materials which could interfere with the smelting or metal recovery steps.

In addition to removing the non-cermet material, the beneficiation process also involves comminuting the cermet material by crushing, grinding and/or milling to produce particle sizes which are suitable for smelting in a smelter. In some instances non-cermet materials may inadvertently find their way into the cermet material which is undergoing crushing, grinding, or milling. This material will generally not be comminuted because it does not have the friability characteristics of the cermet. Upon completion of or during the process of comminution, these materials should be removed by any conventional sorting or screening procedure. Thus, in some instances beneficiation will involve additional sorting. On completion, the product of beneficiation is a concentrate for smelting. This beneficiating process differs from the beneficiation of most ores since most ores require the normal sorting, crushing, and milling and additionally require the step of physically separating and removing earthy components from the ore which have little or no metal value. For example, the process steps of concentration by the use of flotation separators to separate the metal compound components of value from unwanted earthy or low metal value components of the ore, is required in the beneficiation of ore of low metal value. However, the concentration step required when beneficiating the inert anode material is separating and removal of the non-cermet components therefrom which additionally concentrates an already sufficient percentage of the metal value to qualify as a concentrate on completion of the beneficiation process.

There is no economic or metallurgical need to further concentrate the metal content of the inert anode material, other than the removal of the non-cermet materials, during the beneficiation process because once the cermet material has been isolated and crushed or milled, it has sufficient metal value content to be economically recovered in a smelting operation. In other words the comminuted cermet has a sufficiently high concentration of metal to be recovered in the isolated smelter to qualify as a concentrate Tot use as a smelter feedstock.

In short, therefore, the completion of the beneficiating process of the inert anode material is accomplished by sorting and removal of non-cermet components to isolate the cermet and comminuting the isolated cermet by any comminuting procedure such as crushing, grinding, milling or a combination of these procedures to produce a flowable powder or granular material without any further steps being necessary. The finished concentrate may be improved however, by adding fluxing agents thereto in unit 10.

The beneficiated inert anode material (i.e., the comminuted cermet component of the inert anode) is a finished metal concentrate that can be sent directly to a smelter 4 as shown in FIG. 1. It may be preferable, however, that the beneficiated inert anode material is combined with other metal sulfide concentrate compositions that contain additional metals and fluxes which improve the quality of the smelter feedstock.

Figure 3:
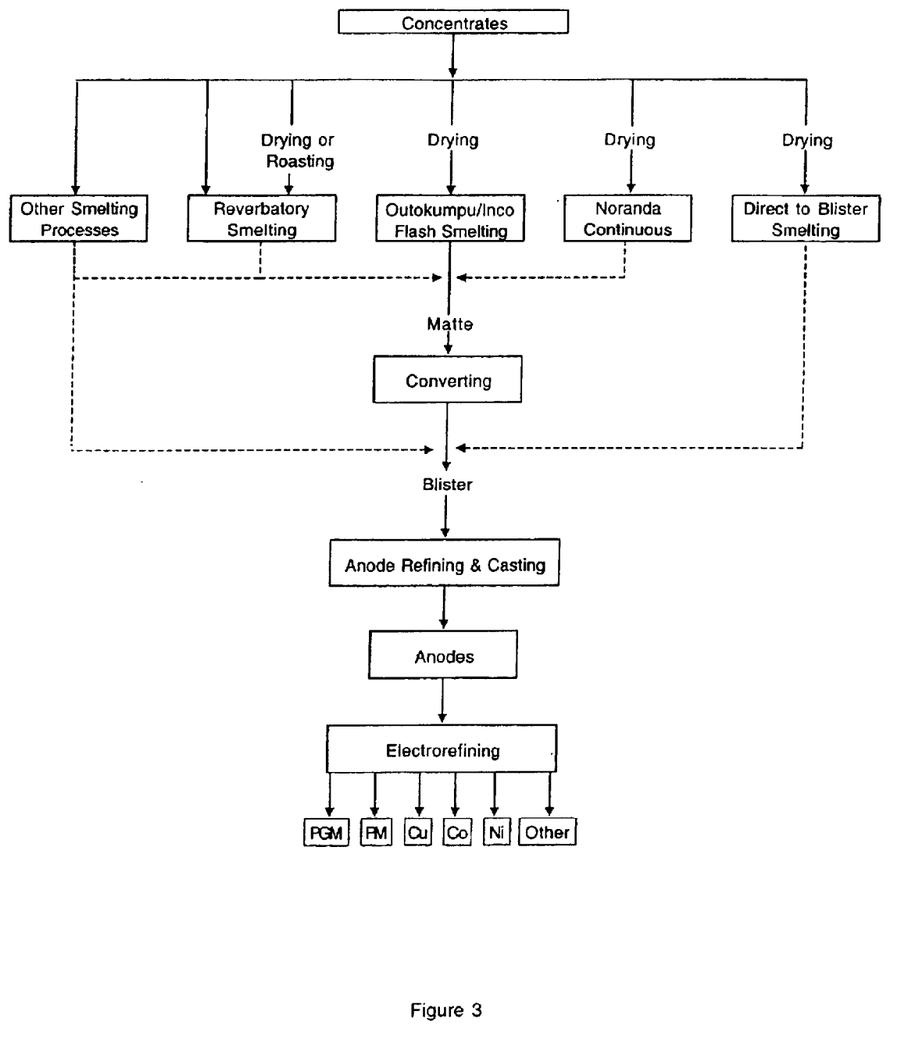
FIG. 3 is a flow sheet which illustrates the various types of smelting schemes that may be used in this invention.

Various smelting processes which may be used in this invention are shown in FIG. 3. Depending on the smelting process to be used concentrate or concentrate composition of this invention is preferably agglomerated and/or pelletized in agglomerate/pelletizing unit 3. Binders are advantageously added to the concentrate to aid in the agglomeration and/or pelletizing of the concentrate. Conventional binders such as organic binders are useful for this purpose. In addition, conventional dust suppressants may be used during or after the agglomeration and/or pelletizing of the concentrate.

Flux reagents may be added to the concentrate as an additive to aid in the smelting of the concentrate. Examples of fluxing reagents which may be used in this invention include alumina, lime, silica, magnesia, iron, and certain other metal compounds such as metal hydroxides and oxides of copper, nickel, cobalt, precious metal and/or a platinum group metal.

The concentrate may be used as a smelter feedstock material by itself or may be introduced into the smelter in combination with nonferrous ores and/or ore concentrates. Thus, one embodiment of this invention envisions the addition of the nonferrous ore and ore concentrates to the cermet based concentrate as an additive. The term "nonferrous ores and concentrate" means that the metals of prime interest in the ore or concentrate is a nonferrous metal which is recoverable in a smelter. The nonferrous ores and concentrates (hereafter ore concentrate) may contain iron in addition to the nonferrous metal, but it is not the prime metal of interest. The nonferrous ore concentrate additive in combination with metal concentrates made from inert anode materials may then be blended or compounded to form a feedstock material which is introduced into the smelter. The various additives (e.g. for example other nonferrous sulfide ore concentrate, binders and flux reagents) are shown in the flow sheet of FIG. 1 by reference numeral 10.

The above-noted ores which may be used as an additive are ores which already have a sufficient concentration of the metal to be recovered in the smelting process (metal of value) without any metal value enrichment steps being required during beneficiation. The above-noted ore concentrates which may be used as an additive are ores wherein the metal values have been enriched or concentrated by removing earthy or unwanted waste material of low metal value from the ore. Both ores which require no enrichment steps to produce the desired metal value concentration as well as ores in which the desired metal value concentration has been obtained by an enrichment step or steps during the beneficiation process may be classified as "ore concentrate". Accordingly the term "ore or concentrate" used herein is intended to include the above-noted ores which have been enriched in a beneficiation process as well as ores which have the desired concentration of metal value without any enrichment steps being necessary during beneficiation.

In an alternative embodiment, the additives are added to the smelter instead of mixing the additives with the beneficiated inert anode material concentrate. As noted above, the smelting process may include a preliminary roasting step 13. In this situation, the beneficiated inert anode material, if combined with process additives such as metal hydroxides or organic binders, roasting will beneficially dry, calcine the hydroxides, and burn the organic matter and at the same time drive off part of the sulphur which is then burned off from the other associated sulfide ores being subject to the roasting process as suggested by Halpin in U.S. Pat. No. 4,356,030.

Since the concentrate of this invention is advantageously combined with ore concentrate at the smelter, the choice of flux or concentrate will vary depending on the particular operating parameters of the smelting facility which is utilized. Smelting facilities typically select the flux based upon the particular ore compounds being utilized and other factors which are well known to those skilled in the field of ore smelting. However, in order to facilitate the use of the concentrate of this invention as a component of the feedstock used at a particular smelting facility, the concentrate may be pre-fluxed with flux additive which matches or enhances the flux being utilized at the smelting facility where the beneficiated inert anode material is to be smelted.

Typically the flux reagents used for nickel smelting are the same as those used for copper smelting however, the proportion used may vary. Thus the concentrate of this invention may include any of the fluxes which are well known in use in nickel and/or copper smelting. Examples and a further discussion of fluxes which are useful in this invention are discussed below.

Flux Compositions

The chemical compositions of ten commercial bottom pour fluxes are shown in Table 1. Silica and alumina, oxide glass network formers, are the major components of all the fluxes. The fluxes also contain FeO, CaO, $Na_2O$, and $K_2O$ which are network breakers (also called fluxes themselves). In addition, the fluxes have smaller amounts of S, MnO, $Cr_2O_3$, $TiO_2$, MgO, $P_2O_5$, and BaO.

TABLE 1

Chemical Composition of Commercial Bottom Pour Fluxes

| Flux. | C | S | FeO | MnO | $Cr_2O_3$ | $TiO_2$ | CaO | $SiO_2$ | MgO | $P_2O_5$ | $Al_2O_3$ | $Na_2O$ | BaO | $X_2O$ | F |
|---|---|---|---|---|---|---|---|---|---|---|---|---|---|---|---|
| A | 0.30 | 0.10 | 1.49 | 0.17 | 0.11 | 0.18 | 7.50 | 66.5 | — | 0.01 | 11.7 | 7.52 | — | 5.23 | 0.13 |
| B | 0.06 | 0.12 | 8.76 | 0.14 | 0.11 | 1.13 | 3.87 | 47.8 | 0.36 | 0.24 | 26.0 | 6.23 | 0.08 | 5.29 | 0.10 |
| B | 0.03 | 0.07 | 9.02 | 0.14 | 0.09 | 1.14 | 3.84 | 47.3 | 0.30 | 0.23 | 26.0 | 5.84 | 0.08 | 5.19 | NA |
| C | 0.18 | 0.24 | 5.17 | 0.13 | 0.09 | 1.09 | 12.8 | 51.6 | 0.64 | 0.08 | 22.2 | 3.86 | 0.06 | 4.17 | 0.16 |
| D | 0.14 | 0.31 | 4.44 | 0.11 | 0.08 | 1.06 | 12.2 | 51.0 | 0.51 | 0.07 | 22.0 | 4.05 | 0.06 | 4.18 | 0.09 |
| E | 0.33 | 0.06 | 3.81 | 0.16 | 0.05 | 0.94 | 11.2 | 54.1 | 0.33 | 0.15 | 20.7 | 4.07 | 0.09 | 2.25 | 2.02 |
| F | 0.04 | 0.10 | 10.7 | 0.15 | 0.14 | 1.03 | 5.24 | 46.8 | 0.05 | 0.23 | 23.9 | 7.50 | 0.12 | 4.27 | 0.08 |
| F | 0.14 | 0.13 | 10.4 | 0.15 | 0.02 | 1.04 | 5.93 | 48.0 | 0.22 | 0.21 | 24.3 | 6.97 | 0.11 | 4.36 | NA |
| G | 0.07 | 0.14 | 16.1 | 0.22 | 0.17 | 1.18 | 4.07 | 48.0 | 0.80 | 0.32 | 25.1 | 6.22 | 0.21 | 3.67 | 0.16 |
| H | 0.08 | 0.12 | 16.5 | 0.23 | 0.11 | 1.20 | 3.91 | 40.5 | 0.75 | 0.95 | 25.9 | 6.58 | 0.21 | 4.42 | 0.07 |
| I | 0.19 | 0.17 | 3.78 | 0.16 | 0.13 | 1.12 | 12.4 | 47.8 | 0.91 | 0.08 | 19.5 | 9.97 | 0.05 | 2.50 | 0.84 |
| J | 0.11 | 0.46 | 1.53 | 0.13 | — | 0.84 | 2.15 | 42.7 | 1.22 | 0.02 | 21.3 | 5.04 | 0.05 | 3.46 | 1.30 |
| Min. | 0.03 | 0.06 | 1.49 | 0.11 | 0.02 | 0.18 | 3.84 | 40.5 | 0.05 | 0.01 | 11.7 | 3.86 | 0.05 | 2.25 | 0.08 |
| Max | 0.33 | 0.46 | 16.5 | 0.23 | 0.17 | 1.20 | 21.5 | 66.5 | 1.22 | 0.95 | 26.0 | 9.97 | 0.21 | 5.29 | 2.02 |

NA = Not Analyzed

Additional flux compositions used at specific smelters throughout the world are shown below in table 2.

TABLE 2

| | | Flux composition, pct | | | | | |
|---|---|---|---|---|---|---|---|
| Smelter | Furnace | Cu | $SiO_2$ | $Al_2O_3$ | Fe | CaO | MgO |
| Morenci[1] | Reverberatory | — | 12.3 | 1.0 | 0.7 | 43.9 | — |
| New Cornelia[1] | Reverberatory | — | 3.1 | 0.6 | 0.5 | 54.0 | — |
| Onahama[2] | Reverberatory | — | 79.6 | 6.3 | 2.6 | .9 | — |
| Mufilura[3] | Electric | — | 2.1 | 0.6 | — | 52.8 | 0.6 |
| KCC Utah | Reverberatory | — | 6.7 | — | — | 52.2 | — |
| | Reverberatory | — | 67.9 | 2.0 | 4.0 | 7.6 | 3.0 |

[1]Arizona
[2]Japan
[3]Zanbia
[4]Utah

Flux normally consists of sand high in silica content, and usually limestone to make the slag more fluid. Sometimes "direct smelting ore" is used, which adds both fluxing material and additional copper.

TABLE 3

Compositions of Industrial Concentrates, Fluxes, Mattes

| | | Concentrate | | | | | Flux | | | | Matte | | | |
|---|---|---|---|---|---|---|---|---|---|---|---|---|---|---|
| Smelter | Process | Cu | Fe | S | $SiO_2$ | other | $SiO_2$ | $Al_2$ | $Fe_2O_3$ | other | Cu | Fe | S | O |
| Magma | Outokumpu Flash | 30 | 28 | 33 | 6 | ($Al_2O_3$—CaO—MgO) 2 | 95 | 2 | 2 | CaO 1 | 62 | 14 | 23 | 1 |
| Chino | Inco Flash | 25 | 29 | 36 | 5 | $Al_2O_3$ 1 | 90 | 3 | 3 | Cu 1.7 | 58 | 18 | 23 | 2 |
| Ilo | Reverberatory Furnace | 28 | 27 | 32 | 6 | $Al_2O_3$ 3 | 90 | 2 | 3 | CaO 1 | 35 | 34 | 24 | 3 |
| Mufulira | Electric Furnace | 39 | 16 | 21 | 12 | $Al_2O_3$ 2 CaO 2 MgO 2 | 2 | 2 | | $CaCO_3$ 95 MgO 2 | 57 | 18 | 22 | 1 |
| Southern Copper | Noranda Furnace | 26 | 28 | 33 | 4 | $Al_2O_3$ 1 | 96 | | | | 70 | 6 | 21 | |
| Caletones | Teniente Furnace | 31 | 25 | 34 | 6 | $Al_2O_3$ 3 | 91 | 5 | | | 75 | 4 | 21 | |

Figure 2:
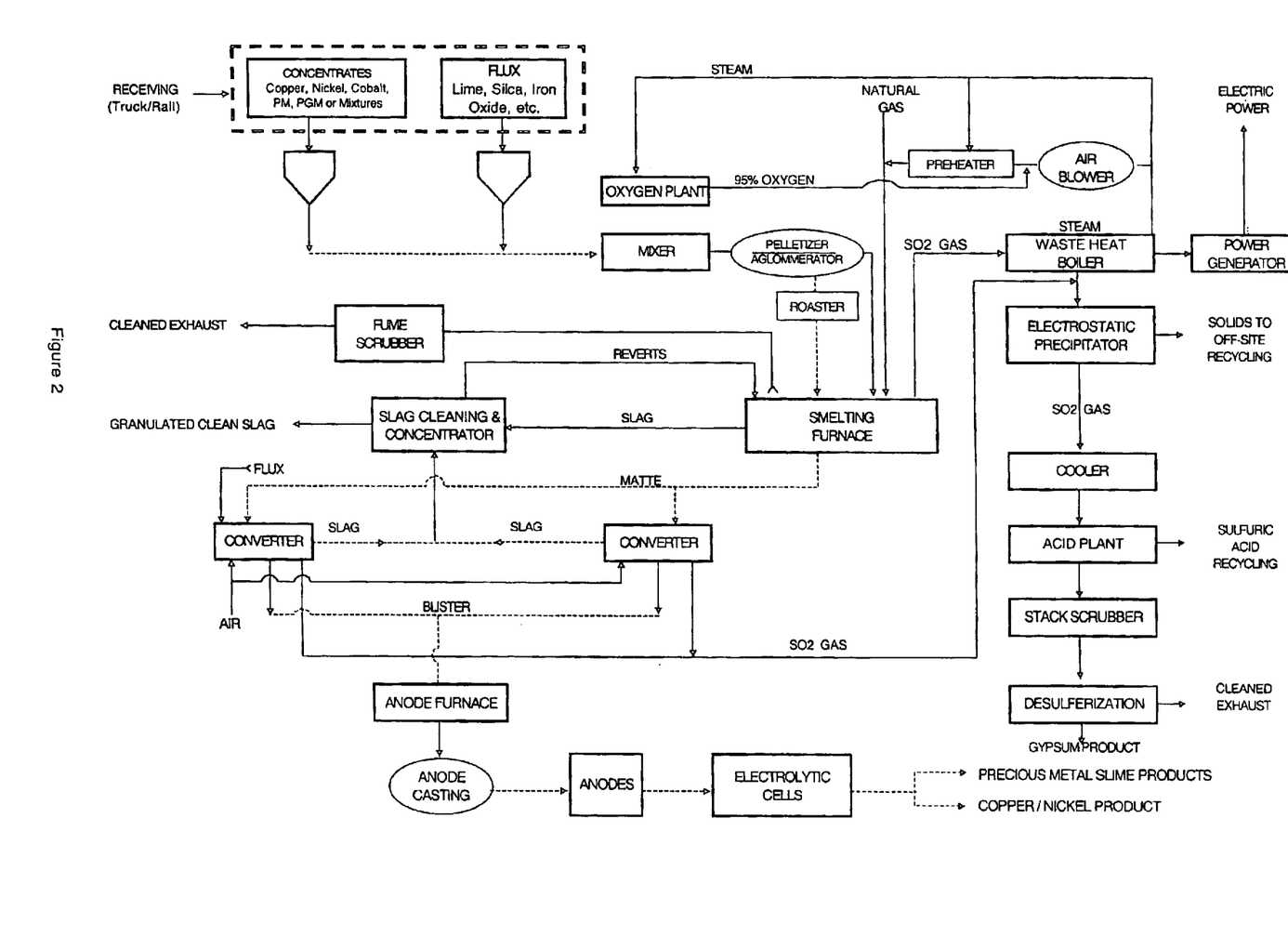
FIG. 2 is a flow sheet which illustrates a scheme for smelting copper and/or nickel concentrates having sufficient sulfide compounds such that the process is nearly or completely auto thermal.

The smelting procedure that is particularly useful in the present invention is illustrated in FIG. 2. As noted above, the procedure economically and efficiently recovers the metal values from the concentrate from the present invention when combined and processed with sulfide ore concentrate. If this is done, the typical smelting process used is described below.

The Smelting Process

1. Function—Generically, smelting is a pyrometallurgical process to extract selected metals from other metals and/or mineral impurities with which they are either physically or chemically combined. The process to obtain the metal values contained in the metal concentrate of the present invention is preferably accomplished in combination with a nickel sulfide and/or copper sulfide concentrate smelting process. The methods for smelting a sulfide ore concentrate are numerous as is illustrated in FIG. 3 and any of the methods shown can be used to extract the desired metal of value. The method of smelting which is most prevalent in the metal production industry, is shown on the illustration as flash smelting.

Flash smelting was developed in 1949 by the Outokumpu Company in Finland. Outokumpu flash smelters are presently in use in more than 40 smelters worldwide and proven the most economically efficient and environmentally sound of all primary copper and/or nickel smelters. The capacity of flash furnace smelting technology normally ranges from 1500 to 3000 tons of concentrate daily.

Flash smelting entails blowing air, oxygen, concentrates, and flux into a 1250° C. hearth furnace. Once in the hot furnace the sulfide mineral particles of the concentrate (e.g. Ni, Fe, $S_2$ or $CuFeS_2$ or mixture) react rapidly with the $O_2$ of the blast. This results in (i) controlled oxidation of the concentrate's Fe and S, (ii) a large evolution of heat, and (iii) melting of the solids. The process is continuous. When extensive $O_2$-enrichment of the blast is practiced, the process is nearly or completely autothermal (i.e., the heat requirements are produced in the process without any other source of heat being required). The process is perfectly matched to smelting fine particulate concentrates that have a combined sulfur content of 20–35 percent by dry/weight. The products of flash smelting are:
  (a) molten N/Cu—Fe—S matte,
  (b) molten iron silicate slag; and
  (c) hot dust-laden offgas containing $SO_2$.

As illustrated in FIG. 2, the molten matte is sent to converters for oxidation-converting to molten metallic copper and/or nickel, the slag is usually sent to slag treatment for additional metal recovery, and the offgas is sent to heat, dust and $SO_2$ recovery.

The goals of flash smelting are to produce:
  (a) constant composition, constant temperature molten matte for feeding to converters;
  (b) slag which contains only a tiny fraction of the Cu or Ni entering the flash furnace;
  (c) offgas strong enough in $SO_2$ for efficient recovery as $H_2SO_4$; and to:
  (d) accomplish (a), (b), and (c) in a rapid, energy-efficient manner.

The flash smelter furnace design employs an open area above the hearth chamber that is either a vertical chamber directly above the hearth or as an open horizontal one that is integral to the hearth. In each design, the concentrate, flux, and oxygen enriched heated air is blown into these chambers wherein the continuous so-called flash reaction (i.e., chemical reaction) occurs producing molten matte, molten slag, and $SO_2$-bearing offgas. The intermingled molten matte and slag falls and collects in the furnace hearth while the gas fraction consisting of the $SO_2$ and volatiles are exhausted into the gas cleaning system. The two molten fractions of matte and slag are immiscible and because of their difference in specific gravity separate into two distinct layers. Slag being the less dense liquid fraction, floats to the top of the matte where it can be separately removed for further metal recovery, disposal, or beneficial reuse.

The molten matte layer removed to the converter consists primarily of iron and copper and/or nickel sulfides, which are mutually soluble. Since copper and nickel have a weak chemical affinity for oxygen when oxygen is introduced to the converter, very little copper and/or nickel oxide is formed and almost all of the Cu and Ni in the charge accumulate in a layer called blister. Iron, on the other hand, combines readily with oxygen to form iron oxides, which in turn react with silica flux to form iron silicate. These compounds, plus the remaining calcium, magnesium, and aluminum mineral fluxes that were present in the concentrate, form a lighter-density slag which gravimetrically separates from the blister described above while the additional oxygen combines with the sulfur to form $SO_2$ gas which is collected to produce sulfuric acid.

The concentrate and flux initially blown into the flash furnace is proportioned so that the resulting matte that proceeds to the converter typically contains 40–45 percent copper and/or nickel and 25 to 30 percent each of iron and sulfur. The matte contains most of the heavy elements present in the charge, practically all of the precious and platinum group metals, and if present in the concentrate, part of the arsenic and antimony. Contained metals such as arsenic, selenium, and other trace elements form volatile compounds and are carried away in the gas stream.

2. Input Materials—The primary input material is fire dried concentrate particles or blends of dried concentrate. Additionally, reprocessed slags (i.e., reverts) from the converter and anode furnace can be added, as well as flue dusts from dust collection equipment throughout the smelter. Precipitates from hydrometallurgical processes or materials from refinery processing may additionally be added to the input material.

Examples of the input flux, as shown in Table 4, normally consists of sand high in silica content, limestone and other reagents to help adjust the slag fluidity to enhance separation. Prefluxed concentrate, like the concentrate discussed in the present invention is used, which provides fluxing material in addition to the copper and/or nickel, precious and platinum group metals.

The composition of input materials for one furnace in Arizona is reported as follows in Table 4:

TABLE 4

| CHARGE COMPOSITION TO A SMELTING FURNACE (1) | |
|---|---|
| Concentrates | 65% |
| Reverts | 25% |
| Hydrometallurgical precipitate | 2% |
| Flue dusts | 1% |
| Silica flux | 1% |
| Limestone | 6% |

This input charge produced matte, of which, 47 percent was matte and 53 percent was slag prior to being placed in the converter.

3. Operating Conditions—In the flash furnace, the oxidation process provided much or all of the energy for heating and melting. The process is by-and-large, autothermal however, fossil fuel may be used to help control furnace temperature at about 1250° C. $SO_2$ leaves the flash furnace in offgas at high concentration (>10%). The gas is subsequently cooled and cleaned of its dust, and the $SO_2$ is captured as sulphuric acid product.

The smelting process proceeds, as illustrated in FIG. 1, in the usual manner to thereby result in a matte 7 separable from a slag 5. The slag is drawn off and hardened while the matte is separately recovered from the smelter. The recovered matte proceeds to the converter 19 where copper and/or nickel and precious metals are separated from the iron and sulfur constituents. The recovered metal, referred to as blister 12, is either a desired alloy 9, or using conventional metallurgical procedures, such as electro-winning, the blister is refined to recover the principal metal, as well as, any precious metals. The recovery of the principal metal or metals and any precious and platinum group metals from the blister takes place in metal refining unit 8. The metal refining results in the production of nonferrous metals 11 and precious metals 20. Various metals in the matte may be selected for recovery using conventional methods for metal recovery (e.g., electro winning process). The process selectively and sequentially isolates the desired target metal base on the electromotive force of the metal.

The slag is separately recovered and allowed to harden. Slag, depleted of recoverable metal values is advantageously broken into granular form which can then be safely disposed of since it is non-leachable in rainwater as suggested by Halpin in U.S. Pat. No. 4,356,030. Disposal of the slag is shown by reference numeral 14 in FIG. 1. In addition, instead of disposing of the slag, it may be further crushed, granulated, and/or milled and used for various construction applications such as in road building, as a cement (e.g. Portland cement) ingredient, or may be utilized as filler in any process in which a filler is required. Alternatively, the slag 5 may be recycled back to the smelter to recover additional metal values therefrom, if present. In this case, the slag is advantageously granulated and returned to the smelter. Reprocessed slag containing recoverable metal values is referred to as reverts 6 as shown in the drawing.

The beneficial flux reagent additives described herein are used to improve the qualities of the feedstock for smelting. Additives may include selected nonferrous metal hydroxides and oxides, and also may include carbonaceous reducing agents for effecting improvements in the slag characteristics of the smelting process.

As noted above, the slag maybe disposed of. Any low value unrecovered metals and/or metal impurities which remain in the slag are encapsulated within a vitreous or glassy matrix of the slag and thus the slag is suitable for safe disposal and is non-leachable in rainwater. Thus, the present invention also provides an energy efficient method for disposing of the valueless portion of the inert anode material using the above described recovery process while at the same time meeting necessary environmental disposal requirements.

The embodiment of the invention illustrated in FIG. 1 is discussed herein with reference to smelting to encompass plasma are pyrometallurgical metal separation/recovery process technology and more conventional smelting operations 4 for the recovery of copper and nickel from sulfide or laterite based ore, the conventional smelting process having beneficiated inert anode based concentrate added thereto for the reasons set forth above. The result of these processes are blister containing the recovered selected metal values 12 that can be further refined 8 or marketed as an alloy 9.

The metals which are recovered from the inert anode material include copper, nickel, cobalt, tin, gold, silver, platinum, rhodium and palladium as well as other metals which may be included in the inert anode material. All of the above noted metals are recoverable from the matte produced during the smelting procedure.

In certain instances it may be desirable to target certain metals for recovery. In particular, it is desirable to select the recovery of copper, nickel, cobalt, gold, silver, platinum, palladium and rhodium by this process. For example copper may be targeted in a copper smelter so that nickel recovery would be less efficient.

In addition to the advantageous recovery of metal values from the inert anode material and other cermet materials, the present invention also provides additional advantages. In particular, the slag produced by the primary smelter encapsulates non-recoverable metals found in the inert anode material or other cermet material. This encapsulation immobilizes these metals as the Best Demonstrated Technology (BAT) to minimize leaching and thereby renders these materials sufficiently stable to meet current United States Environmental Protection Agency (EPA) standards in this regard.

Another advantage relates to the use of primary smelters in this invention. In this regard primary smelters have the capability of preventing or significantly abating emission of toxic substances into the environment. Thus, by using a primary smelter to process the cermet based concentrate, any toxic emissions resulting from the smelting of the cermet or inert anode material will be significantly minimized by capturing airborne or gaseous deleterious constituents in the exhaust gas cleaning system 21 and 22.

While the present invention has been described in terms of certain preferred embodiments, one skilled in the art will readily appreciate that various modifications, changes, omissions, and substitutions may be made without departing from the spirit thereof. It is intended, therefore, that the present invention be limited solely by the scope of the following claims.

We claim:

1. A smelter feedstock composition from which metal values are recoverable in a smelter, said composition consisting essentially of comminuted cermet and a fluxing additive to facilitate smelting of said feedstock composition in a smelter wherein said cermet is isolated from inert used anode, inert unused anode, inert anode manufacturing residue or combinations thereof; and said smelter composition has been agglomerated or pelletized whereby said composition is in the form of granules or pellets.

2. The composition of claim 1 which has been roasted under oxidizing conditions to oxidize a portion of said composition.

3. The composition of claim 1 wherein said fluxing additive is selected from the group consisting of alumina, lime, silica, magnesia, iron, metal hydroxide and mixtures thereof.

4. The composition of claim 3 wherein said metal hydroxide is at least one hydroxide of a metal selected from the group consisting of copper, nickel, cobalt, precious metal and platinum group metal.

5. The composition of claim 1 which further comprises an ore concentrate.

6. A method for recovering metal values from smelter feedstock which comprises smelting said feedstock in a smelter which produces a first component containing said metal and a second component which is slag; and recovering said metal values from said first component; wherein said smelter feedstock composition consists essentially of comminuted cermet and a fluxing additive to facilitate smelting of said feedstock composition in a smelter; wherein said cermet is isolated from inert used anode, inert unused anode, inert anode manufacturing residue or combinations thereof; and said smelter composition has been agglomerated or pelletized whereby said composition is in the form of granules or pellets.

7. The method of claim 6 wherein said smelter feedstock composition has been roasted under oxidizing conditions to oxidize a portion of said feedstock composition.

8. The method of claim 6 wherein said fluxing additive is selected from the group consisting of alumina, lime, silica, magnesia, iron, metal hydroxide and mixtures thereof.

9. The method of claim 8 wherein said metal hydroxide is at least one hydroxide of a metal selected from the group consisting of copper, nickel, cobalt, precious metal, platinum group metal and mixtures thereof.

10. The method of claim 6 wherein said smelter feedstock further comprises an ore concentrate.

11. A method for treating inert anodes which comprises isolating cermet from said anodes; comminuting said isolated cermet to produce comminuted cermet; optionally using some or all of said comminuted cermet as a component in the manufacturing of inert anodes which contain cermet as a component thereof; and using all or a portion of said comminuted cermet as smelter feedstock in a smelting procedure to thereby recover metal values from said cermet; wherein said smelter feedstock further comprises ore concentrate.

12. The method of claim 11 wherein said smelter feedstock further comprises a fluxing additive to aid in said smelting.

* * * * *